(No Model.)
R. K. GREGORY.
BICYCLE TIRE.
No. 565,451. Patented Aug. 11, 1896.
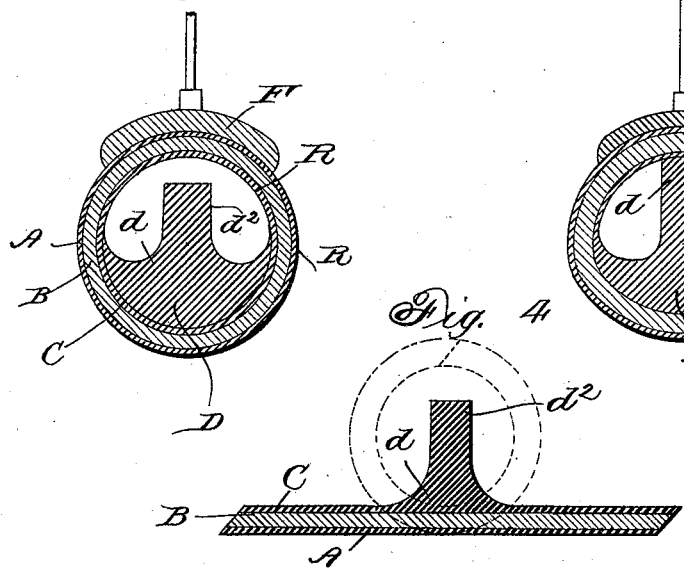
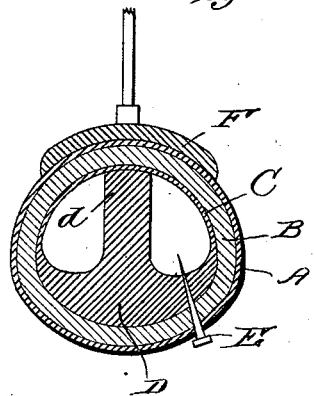
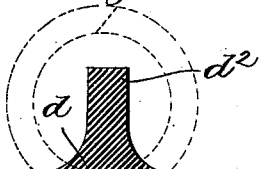
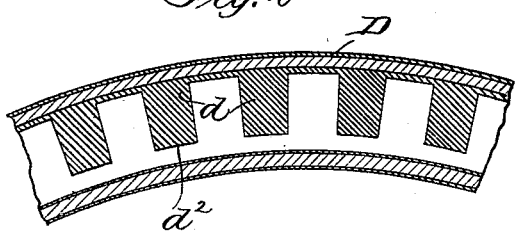
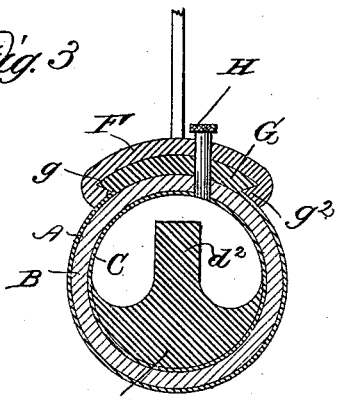
WITNESSES:
INVENTOR
Richard K Gregory
BY
Edgar Tate & Co
ATTORNEYS

UNITED STATES PATENT OFFICE.

RICHARD KIDDER GREGORY, OF GREENSBOROUGH, NORTH CAROLINA.

BICYCLE-TIRE.

SPECIFICATION forming part of Letters Patent No. 565,451, dated August 11, 1896.

Application filed December 6, 1895. Serial No. 571,248. (No model.)

*To all whom it may concern:*

Be it known that I, RICHARD KIDDER GREGORY, a citizen of the United States, and a resident of Greensborough, in the county of Guilford and State of North Carolina, have invented certain new and useful Improvements in Bicycle-Tires, of which the following is a specification, reference being had to the accompanying drawings, forming a part thereof, in which similar letters of reference indicate corresponding parts.

This invention relates to tires for bicycles and similar vehicles; and the object thereof is to provide an improvement in what are known as "tubular" tires, and particularly to that class thereof known as "pneumatic" tires; and with this and other objects in view the invention consists in the construction, combination, and arrangement of parts hereinafter described and claimed.

The invention is fully disclosed in the following specification, of which the accompanying drawings form a part, in which—

Figure 1 is a transverse section of a tire made according to my invention; Fig. 2, a longitudinal section of a portion thereof; Fig. 3, a transverse section similar to that shown in Fig. 1, but also showing an improved method of connecting the tire with the rim of a wheel; Fig. 4, a sectional view showing the process of forming a tire; Fig. 5, a transverse section which is designed to illustrate the result produced by the puncture of the tire.

In the practice of my invention, reference being made to Fig. 1, I provide a tube A, of rubber, within which is placed a heavier tube B, of rubber and canvas, and within the tube B is placed a thinner tube C, which is also composed of rubber, and which is adapted to be inflated in the usual manner.

Within the tube C, and preferably secured to the outer portion thereof, is a reinforcing ring D, which is composed of rubber, and which is provided with outwardly-directed partial partitions or plates $d$, which are provided with shoulders or projections $d^2$, which project outwardly or in the direction of the bearing portion or tread of the tire, as clearly shown in Figs. 1 and 2, and which are intended to strengthen the tire and to prevent the same from collapsing if the tire should be punctured by a tack, nail, or other device, as shown at E in Fig. 5.

The partitions $d$ and the outwardly-directed shoulders $d^2$ are formed at regular intervals on the ring D and project approximately across the inner portion of the tire, and if the latter should be punctured these shoulders or projections will strike upon the outer surface of the tube C, as shown in Fig. 5, and prevent the utter collapse of the tire, which would otherwise result.

In Fig. 4 I have shown the method of forming my improved tire, which consists in providing three strips, from which the tubes A, B, and C are formed, and which are folded together as shown in dotted lines in said figure, and the edges of which are secured together by a process well known by those familiar with the manufacture of tubular tires.

My improved tire may be connected with the rim F of a wheel, as shown in Figs. 1 and 5, in the usual manner; but in Fig. 3 I have shown an improved method of making this connection, which consists in forming on the outer tube A an annular rim or projection G, the edges of which are directed outwardly, as shown at $g$, and the rim F in this form of construction is provided with inwardly-directed edges, as shown at $g^2$, which are adapted to overlap the projecting edges of the annular shoulder or projection G, and to be secured thereto in any desired manner. I have also shown in this figure a tube H, through which the tire may be inflated by an air-pump in the usual manner.

As another modification, I may also form the entire tire of a single tube of heavy soft rubber and form within the same, on the bearing side thereof, inwardly-directed shoulders or projections $d^2$, as hereinbefore described, and which will serve for the same purpose as herein set out, the only difference being that the tubular tire is formed from a single piece or a single tube.

My invention is not limited to the exact form, construction, combination, and arrangement of parts shown and described, and I therefore reserve the right to make all such alterations therein and modifications thereof as fairly come within the scope of the invention.

Having fully described my invention, I claim as new and desire to secure by Letters Patent—

The combination with a pneumatic tire, of an inner elastic hollow forcing-ring formed from a blank having transverse integral ridges formed at regular intervals on the inner face and rectangular integral shoulders projecting therefrom at right angles to the face of the blank, said shoulders or projections being of sufficient length to extend nearly across the diameter of the ring made from the blank, all constructed and arranged as herein shown and described.

In testimony that I claim the foregoing as my invention I have signed my name, in presence of the subscribing witnesses, this 3d day of December, 1895.

RICHARD KIDDER GREGORY.

Witnesses:
  ROBERT JOHNSTON MARKS,
  GASTON WINGATE WARD.